(12) United States Patent
Yin et al.

(10) Patent No.: US 10,785,043 B2
(45) Date of Patent: Sep. 22, 2020

(54) LOAD SHEDDING SYSTEM, COMMUNICATION METHOD AND ACCESS APPARATUS THEREOF

(71) Applicants: STATE GRID JIANGSU ELECTRIC POWER CO., LTD, Nanjing, Jiangsu (CN); NARI TECHNOLOGY CO., LTD, Nanjing, Jiangsu (CN)

(72) Inventors: Jijun Yin, Jiangsu (CN); Qing Chen, Jiangsu (CN); Zheng Wu, Jiangsu (CN); Xiao Lu, Jiangsu (CN); Hengzhi Cui, Jiangsu (CN); Jianyu Luo, Jiangsu (CN); Chunlei Xu, Jiangsu (CN); Xueming Li, Jiangsu (CN); Xiangdong Chen, Jiangsu (CN); Kaiming Luo, Jiangsu (CN); Bijun Li, Jiangsu (CN); Lin Liu, Jiangsu (CN); Yunsong Yan, Jiangsu (CN); Jianfeng Ren, Jiangsu (CN); Haifeng Xia, Jiangsu (CN)

(73) Assignees: State Grid Jiangsu Electric Power Co., Ltd., Nanjing, Jiangsu (CN); Nari Technology Co., Ltd., Nanjing, Jiangsu (CN)

( * ) Notice: Subject to any disclaimer, the term of this patent is extended or adjusted under 35 U.S.C. 154(b) by 0 days.

(21) Appl. No.: 16/409,709

(22) Filed: May 10, 2019

(65) Prior Publication Data
US 2020/0252226 A1 Aug. 6, 2020

(30) Foreign Application Priority Data
Feb. 1, 2019 (CN) .......................... 2019 1 0104886

(51) Int. Cl.
*H04L 12/10* (2006.01)
(52) U.S. Cl.
CPC .................................. *H04L 12/10* (2013.01)

(58) Field of Classification Search
CPC combination set(s) only.
See application file for complete search history.

(56) References Cited

U.S. PATENT DOCUMENTS 5,353,413 A * 10/1994 Novakovich ....... B61L 15/0036
701/117
5,506,903 A * 4/1996 Yamashita ............ H03M 13/15
380/216

(Continued)

FOREIGN PATENT DOCUMENTS

CN         202004760 U  * 10/2011
CN         106972499 A  *  7/2017

(Continued)

OTHER PUBLICATIONS

E. G. Tarpara et al., FPGA based 1 channel fiber optic analog signal link using 8B-10B encoding scheme, IEEE-ICAECC, 2014, pp. 1-6 (Year: 2014).*

(Continued)

*Primary Examiner* — Berhanu Tadese
(74) *Attorney, Agent, or Firm* — Arent Fox LLP

(57) ABSTRACT

Provided are an accurate load shedding system, and a communication method and an access apparatus thereof. The access apparatus includes: two E1 interfaces, eight optical fiber interfaces, a CPU and an FPGA. The two E1 interfaces are respectively connected to a control apparatus A and a control apparatus B of a control substation. The eight optical fiber interfaces are respectively connected to eight control terminals. The FPGA includes eight optical fiber transceivers respectively connected to the eight optical fiber interfaces through serial interfaces, and two E1 transceivers respectively connected to the two E1 interfaces through serial interfaces. Each optical fiber transceiver includes a reset submodule. Each E1 transceiver also (Continued)

includes a reset submodule. The CPU is connected to the FPGA through a parallel bus.

12 Claims, 3 Drawing Sheets

(56) References Cited

U.S. PATENT DOCUMENTS

| | | | | |
|---|---|---|---|---|
| 5,673,252 | A * | 9/1997 | Johnson | G01D 4/004 370/346 |
| 5,796,793 | A * | 8/1998 | Kainulainen | H04J 3/0679 370/408 |
| 6,430,210 | B1 * | 8/2002 | McGrath | H04L 27/28 375/130 |
| 6,625,228 | B1 * | 9/2003 | Nervo | H04J 3/0602 370/536 |
| 6,650,649 | B1 * | 11/2003 | Muhammad | H04B 1/406 370/402 |
| 6,782,002 | B1 * | 8/2004 | Dashiff | H04J 3/1635 370/466 |
| 6,988,025 | B2 * | 1/2006 | Ransom | G05B 19/4185 700/295 |
| 6,999,446 | B2 * | 2/2006 | Hall | H01Q 1/246 370/349 |
| 7,075,952 | B1 * | 7/2006 | Torma | H04J 3/1623 370/468 |
| 7,136,725 | B1 * | 11/2006 | Paciorek | H02J 13/0075 700/295 |
| 7,167,453 | B1 * | 1/2007 | Chopping | H04Q 3/66 370/255 |
| 7,254,140 | B1 * | 8/2007 | Rokhsaz | H04L 12/5692 370/401 |
| 7,523,215 | B1 * | 4/2009 | Robinson | H04L 69/24 709/235 |
| 8,368,310 | B1 * | 2/2013 | Roosli | H04L 12/2827 315/152 |
| 8,536,792 | B1 * | 9/2013 | Roosli | H04L 12/66 315/159 |
| 8,773,827 | B2 * | 7/2014 | Kiko | G05F 1/66 361/62 |
| 8,866,343 | B2 * | 10/2014 | Abraham | G05D 23/1902 307/85 |
| 8,901,769 | B2 * | 12/2014 | Altonen | H04L 12/14 307/31 |
| 8,975,778 | B2 * | 3/2015 | Altonen | E06B 9/68 307/31 |
| 9,013,059 | B2 * | 4/2015 | Altonen | E06B 9/68 307/31 |
| 9,124,130 | B2 * | 9/2015 | Altonen | H02J 3/12 |
| 9,392,669 | B2 * | 7/2016 | Recker | H05B 47/16 |
| 9,398,422 | B2 * | 7/2016 | Zampini, II | H04W 52/0296 |
| 9,602,366 | B1 * | 3/2017 | Manin | H04L 43/10 |
| 9,860,965 | B2 * | 1/2018 | Recker | H02J 9/02 |
| 9,872,153 | B2 * | 1/2018 | Zampini, II | H04W 52/0296 |
| 9,991,710 | B2 * | 6/2018 | Altonen | H04L 12/14 |
| 10,009,987 | B2 * | 6/2018 | Recker | H05B 47/16 |
| 10,034,359 | B2 * | 7/2018 | Recker | H02J 7/34 |
| 10,499,478 | B2 * | 12/2019 | Recker | H02J 7/34 |
| 2002/0126650 | A1 * | 9/2002 | Hall | H01Q 1/246 370/349 |
| 2003/0035369 | A1 * | 2/2003 | Hayashi | G06F 11/1625 370/216 |
| 2003/0179769 | A1 * | 9/2003 | Shi | H04J 3/1694 370/442 |
| 2004/0037359 | A1 * | 2/2004 | Farineau | H04B 7/18515 375/240.16 |
| 2004/0246891 | A1 * | 12/2004 | Kay | H04L 27/0008 370/215 |
| 2005/0063396 | A1 * | 3/2005 | Yu | H04J 3/085 370/401 |
| 2005/0100056 | A1 * | 5/2005 | Chuberre | H04B 7/18543 370/532 |
| 2007/0230331 | A1 * | 10/2007 | Lee | H04B 3/544 370/217 |
| 2009/0206059 | A1 * | 8/2009 | Kiko | G01R 31/327 218/143 |
| 2011/0031806 | A1 * | 2/2011 | Altonen | H05B 47/105 307/32 |
| 2012/0001487 | A1 * | 1/2012 | Pessina | H05B 47/105 307/31 |
| 2012/0091213 | A1 * | 4/2012 | Altonen | H05B 47/10 236/51 |
| 2012/0091804 | A1 * | 4/2012 | Altonen | E06B 9/68 307/31 |
| 2012/0095601 | A1 * | 4/2012 | Abraham | E06B 9/68 700/278 |
| 2012/0296974 | A1 * | 11/2012 | Tabe | G06Q 10/06 709/204 |
| 2013/0113284 | A1 * | 5/2013 | Altonen | H04L 12/40013 307/31 |
| 2013/0249441 | A1 * | 9/2013 | Roosli | H04L 12/282 315/312 |
| 2014/0059443 | A1 * | 2/2014 | Tabe | G06Q 50/01 715/738 |
| 2015/0012145 | A1 * | 1/2015 | Kiko | G05F 1/66 700/291 |
| 2015/0171630 | A1 * | 6/2015 | Altonen | F24F 11/30 307/32 |
| 2015/0271557 | A1 * | 9/2015 | Tabe | H04N 21/6131 725/14 |
| 2015/0282261 | A1 * | 10/2015 | Recker | H05B 45/50 315/121 |
| 2016/0127875 | A1 * | 5/2016 | Zampini, II | G01S 5/0226 370/311 |
| 2016/0183067 | A1 * | 6/2016 | Auranen | H04L 65/4061 398/118 |
| 2016/0275294 | A1 * | 9/2016 | Irvine | G06Q 20/02 |
| 2017/0013417 | A1 * | 1/2017 | Zampini, II | H04W 4/33 |
| 2017/0223807 | A1 * | 8/2017 | Recker | H05B 47/16 |
| 2018/0027386 | A1 * | 1/2018 | Zampini, II | G01S 5/00 370/311 |
| 2018/0049300 | A1 * | 2/2018 | Recker | H05B 45/10 |
| 2018/0084627 | A1 * | 3/2018 | Recker | H02J 13/0017 |
| 2018/0192501 | A1 * | 7/2018 | Recker | H02J 9/02 |
| 2018/0263098 | A1 * | 9/2018 | Recker | H05B 47/19 |
| 2018/0287385 | A1 * | 10/2018 | Altonen | H04L 12/14 |
| 2018/0310389 | A1 * | 10/2018 | Recker | H05B 45/20 |
| 2018/0351654 | A1 * | 12/2018 | Amancherla | H04B 10/1149 |
| 2019/0036895 | A1 * | 1/2019 | Irvine | H04L 9/3239 |
| 2019/0097933 | A1 * | 3/2019 | Rutkowski | H04L 43/0876 |
| 2019/0098081 | A1 * | 3/2019 | Rutkowski | H04L 67/1008 |
| 2019/0132815 | A1 * | 5/2019 | Zampini, II | G06Q 10/067 |
| 2019/0296948 | A1 * | 9/2019 | Barzegar | H04B 10/40 |
| 2019/0334754 | A1 * | 10/2019 | Chen | H04L 27/2602 |
| 2020/0106703 | A1 * | 4/2020 | Wood | H04L 45/04 |

FOREIGN PATENT DOCUMENTS

| | | | |
|---|---|---|---|
| CN | 109617834 A | * | 4/2019 |
| KR | 20130133105 A | * | 12/2013 |
| KR | 20160067033 A | * | 6/2016 |

OTHER PUBLICATIONS

CN106972499 to Yicheng et al.—Precise load shedding System—Chinese Language (Year: 2017).*

CN106972499 to Yicheng et al. (Machine Translated)—Precise load shedding System (Year: 2017).*

CN202004760 to Yan et al (Chinese Language)—Optical fiber transceiver with detection function for power failure and fiber breaking (Year: 2011).*

CN202004760 to Yan et al (Machine Translated)—Optical fiber transceiver with detection function for power failure and fiber breaking (Year: 2011).*

* cited by examiner

LOAD SHEDDING SYSTEM, COMMUNICATION METHOD AND ACCESS APPARATUS THEREOF

CROSS-REFERENCES TO RELATED APPLICATIONS

This application claims priority to a Chinese patent application No. 201910104886.7 filed on Feb. 1, 2019, the disclosure of which is incorporated herein by reference in its entirety.

TECHNICAL FIELD

Embodiments of the present invention relate to the technical field of power systems, and particularly to a load shedding system, and a communication method and an access apparatus thereof.

BACKGROUND

One control terminal in a conventional safety and stability control system occupies a 2M channel. In the where the number of accessing control terminals is large, if each control terminal independently occupies a 2M channel, a large amount of communication bandwidth will be occupied, which is not conducive to saving investment.

A load shedding system can centralize interruptible loads of dispersed power users for millisecond level precision control, and can implement flexible adjustment, thereby achieving power supply and demand balance immediately. An existing load shedding system may be generally divided into three layers, i.e., a control master station layer, a control substation layer and a terminal user access layer. However, the existing load shedding system does not have an access apparatus specifically capable of achieving data interaction of the control substation layer and the terminal user access layer, and does not involve the reliability of the load shedding system.

SUMMARY

The present disclosure provides a load shedding system, and a communication method and an access apparatus for the load shedding system, capable of improving the reliability, saving cost and reducing the maintenance difficulty in addition to reducing the communication bandwidth occupied by a safety and stability control system solution.

In a first aspect, embodiments of the present invention provide an access apparatus. The access apparatus includes: two E1 interfaces, eight optical fiber interfaces, a central processing unit (CPU) and a field programmable gate array (FPGA).

The two E1 interfaces are respectively connected to a control apparatus A and a control apparatus B of a control substation.

The eight optical fiber interfaces are respectively connected to eight control terminals.

The FPGA includes eight optical fiber transceivers and two E1 transceivers. The eight optical fiber transceivers are respectively connected to the eight optical fiber interfaces through serial interfaces, and the two E1 transceivers are respectively connected to the two E1 interfaces through serial interfaces. Each optical fiber transceiver includes a reset submodule, and each E1 transceiver also includes a reset submodule.

The CPU is connected to the FPGA through a parallel bus.

In one or more embodiments, the FPGA further includes a watchdog module connected to the CPU.

The watchdog module is configured to reset the access apparatus in response to determining that the CPU fails.

The CPU is configured to reset the access apparatus in response to determining that the FPGA fails and in response to determining that the number of times the CPU resets the access apparatus is less than or equal to 3.

In one or more embodiments, a physical layer of the optical fiber transceiver adopts 8b10b encoding mode, and a communication rate is 32.768 Mbits/s.

A physical layer of the E1 transceiver conforms to ITU-T G.703 specification, a communication rate is 2 Mbits/s, and a bit error rate is less than 10'.

In one or more embodiments, the reset submodule of the optical fiber transceiver is configured to reset the optical fiber transceiver in response to determining that the optical fiber transceiver fails, and the reset submodule of the E1 transceiver is configured to reset the E1 transceiver in response to determining that the E1 transceiver fails.

In a second aspect, embodiments of the present invention further provide a load shedding system. The system includes: the access apparatus in the first aspect of embodiments of the present invention, a control substation, and at least one control terminal.

In a third aspect, embodiments of the present invention further provide a communication method applicable to the load shedding system in the second aspect of embodiments of the present invention. The method includes: receiving downlink data sent by a control substation; processing the downlink data with a multiplexing algorithm; and sending the processed downlink data to a control terminal.

The downlink data is two data frames or two command frames, the processed downlink data is two processed data frames or two processed command frames. The two data frames or the two command frames respectively correspond to the control apparatus A and the control apparatus B of the control substation.

In one or more embodiments, the communication method further includes: receiving uplink data sent by the control terminal; processing the uplink data with the multiplexing algorithm; and sending the processed uplink data to the control substation.

The uplink data is one data frame and the processed uplink data is one processed data frame.

In one or more embodiments, the command frame includes 12 words, and each word includes 16 bits. The command frame includes: a frame header with a length of 1 word, a control command with a length of 8 words, overall information with a length of 1 word, a sending sequence number with a length of 1 word and a cyclic redundancy check (CRC) code with a length of 1 word, and the control command includes a positive code and a negative code.

In one or more embodiments, the data frame includes 12 words, and each word includes 16 bits. The data frame includes: a frame header with a length of 1 word, data information with a length of 8 words, overall information with a length of 1 word, a sending sequence number with a length of 1 word and a CRC code with a length of 1 word.

In a fourth aspect, embodiments of the present invention further provide a computer readable storage medium which stores a computer program. The computer program, when executed by a processor, realizes the communication method of the load shedding system in the third aspect of embodiments of the present invention.

The access apparatus provided by the present invention includes: two E1 interfaces, eight optical fiber interfaces, a central processing unit (CPU) and a field programmable gate array (FPGA). The two E1 interfaces are respectively connected to the control apparatus A and the control apparatus B of a control substation. The eight optical fiber interfaces are respectively connected to eight control terminals. The FPGA includes eight optical fiber transceivers and two E1 transceivers. The eight optical fiber transceivers are respectively connected to the eight optical fiber interfaces through serial interfaces, and the two E1 transceivers are respectively connected to the two E1 interfaces through serial interfaces. Each optical fiber transceiver includes a reset submodule, and each E1 transceiver also includes a reset submodule. The CPU is connected to the FPGA through a parallel bus. The access apparatus can achieve data receiving and sending through the FPGA, the two E1 interfaces and the eight optical fiber interfaces, and thus, is applicable to actual engineering. Meanwhile, in the FPGA, each optical fiber transceiver is provided with the reset submodule, and each E1 transceiver is also provided with the reset submodule, so the reliability of the access apparatus is improved, thereby saving the investment cost and reducing the maintenance difficulty while reducing the communication bandwidth occupied by a conventional safety and stability control system solution.

DETAILED DESCRIPTION

The present invention will be further described below in detail in combination with drawings and embodiments. It can be understood that specific embodiments described herein are only used for explaining the present invention, not used for limiting the present invention. In addition, it shall be indicated that for ease of description, drawings only show some structures related to the present invention rather than all structures.

It should be indicated that terms "system" and "network" in the present disclosure are often used interchangeably herein. "And/or" mentioned in embodiments of the present invention refers to any and all combinations including one or more related listed items. Terms, such as "the first" and "the second", in the description, claims and drawings of the present invention are used for distinguishing different objects, rather than defining a specific sequence.

It should also be indicated that the following embodiments of the present invention can be executed independently, or in combination with each other, which is not specifically limited in embodiments of the present invention.

The load shedding system, the communication method, the access apparatus and technical effects thereof are described below in detail.

Figure 1:
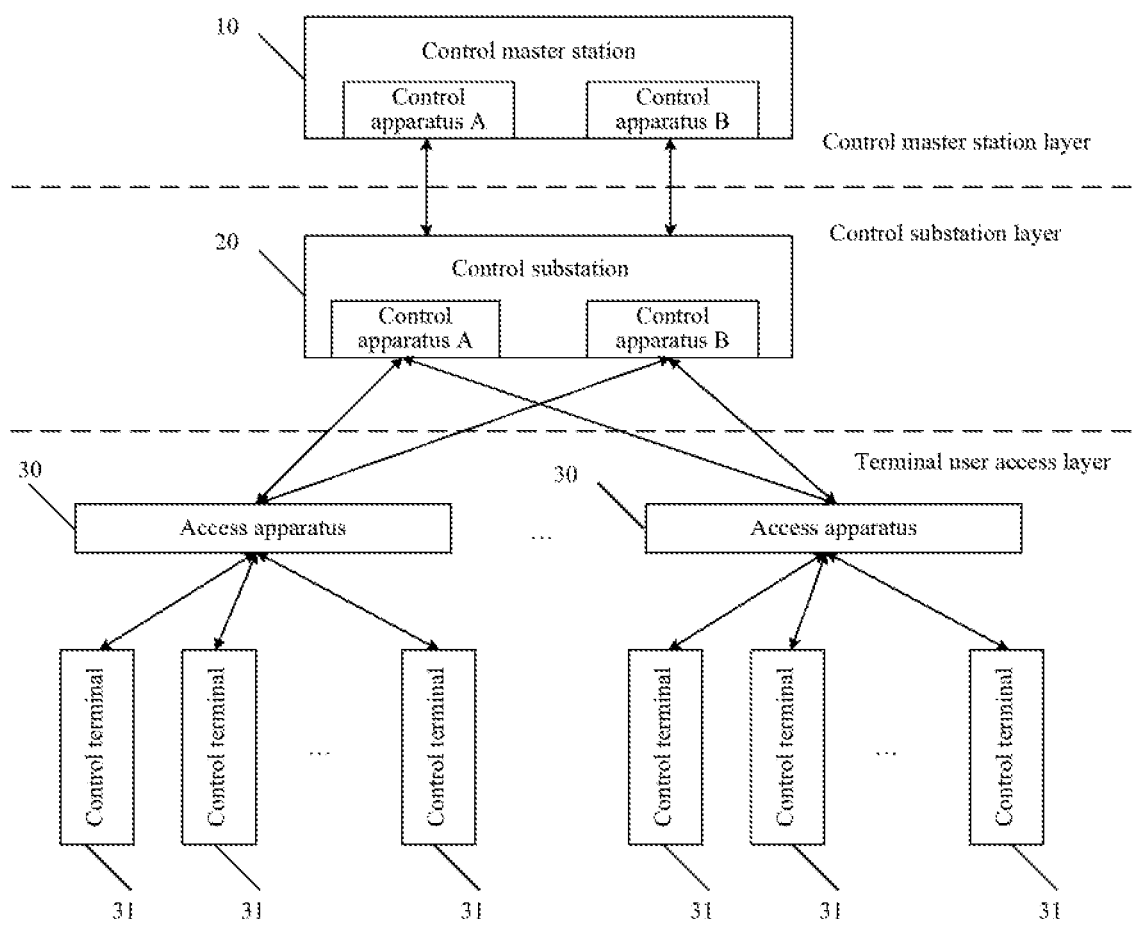
FIG. 1 is a structural schematic diagram illustrating a load shedding system provided by an embodiment of the present invention.

FIG. 1 is a structural schematic diagram illustrating a load shedding system provided by an embodiment of the present invention. The load shedding system includes: a control master station layer, a control substation layer and a terminal user access layer.

The control master station layer includes a control master station 10, and the control master station 10 is divided into a control apparatus A and a control apparatus B. The control master station 10 is usually a 500 kV AC collecting station having a good channel condition near a converter station at a DC dropping location. The control master station 10 may receive a load shedding instruction sent by a superior stability control system, distribute loads, and issue the load shedding instruction.

The control substation layer includes a control substation 20, and the control substation 20 is divided into a control apparatus A and a control apparatus B. The control substation 20 is connected to the control master station 10 through a Synchronous Digital Hierarchy (SDH) 2 M line. The control substation 20 is generally a 500 kV AC station and/or a 220 kV AC station arranged in a load lumped region. The control substation 20 may collect sheddable load information in the region, send the sheddable load information to the control master station 10, and execute the load shedding instruction sent by the control master station.

The terminal user access layer includes an access apparatus 30 and at least one control terminal 31. The access apparatus 30 is connected to the control substation 20 through a synchronous digital hierarchy (SDH) device, and each access apparatus may be connected to eight control terminals 31 at most.

Figure 2:
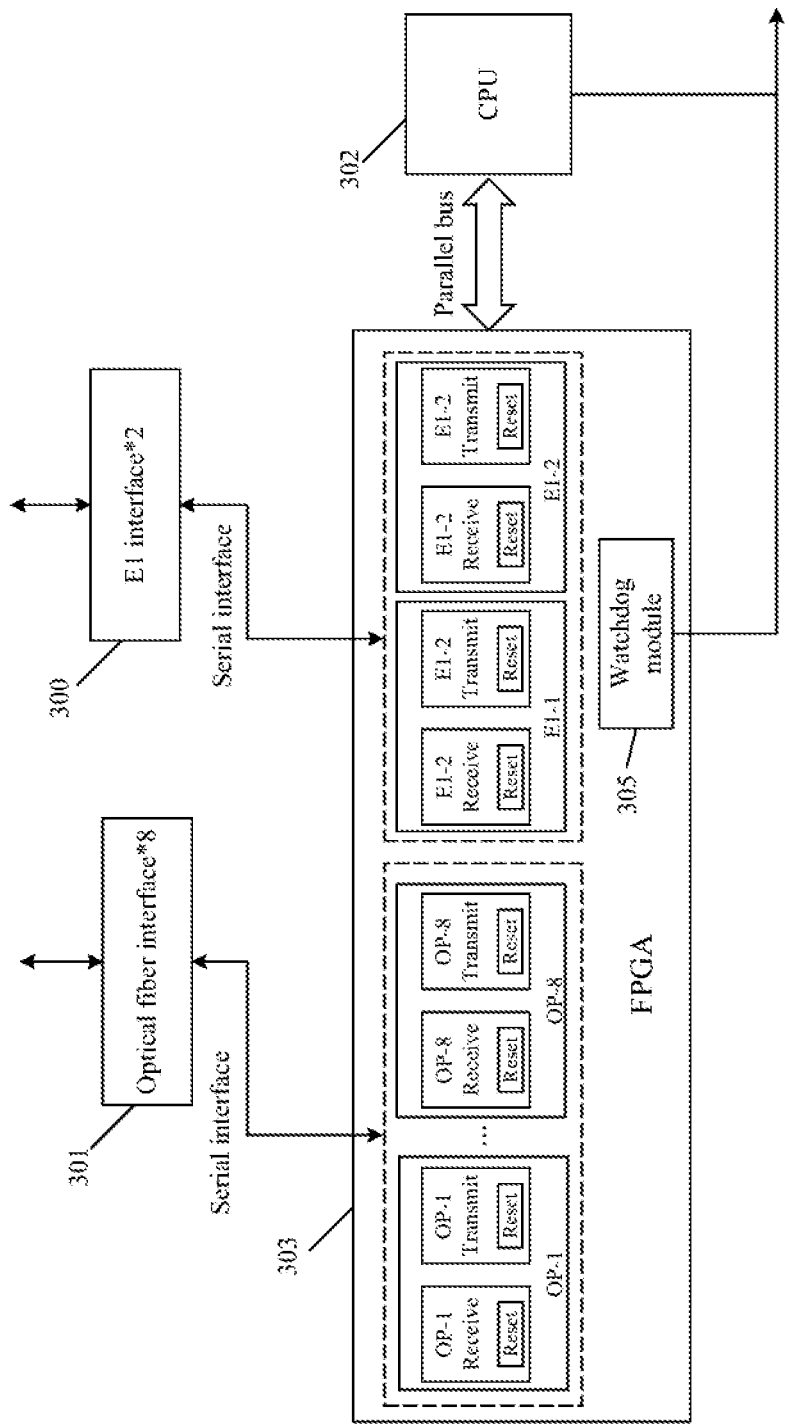
FIG. 2 is a structural schematic diagram illustrating an access apparatus provided by an embodiment of the present invention.

FIG. 2 is a structural schematic diagram illustrating an access apparatus provided by an embodiment of the present invention. The access apparatus includes: two E1 interfaces 300, eight optical fiber interfaces 301, a central processing unit (CPU) 302 and a field programmable gate array (FPGA) 303.

Each of the two E1 interfaces 300 is connected to a corresponding one of the control apparatus A and the control apparatus B of the control substation 20 through an E1 channel.

Each of the eight optical fiber interfaces 301 is connected to a corresponding one of the eight control terminals 31 through a special optical fiber channel.

The FPGA 303 includes eight optical fiber transceivers (denoted by OP-1, OP-2, . . . , OP-8 in FIG. 2) and two E1 transceivers (denoted by E1-1 and E1-2 in FIG. 2). The eight optical fiber transceivers are respectively connected to the eight optical fiber interfaces 301 through serial interfaces. The two E1 transceivers are respectively connected to the two E1 interfaces 300 through serial interfaces. Each optical fiber transceiver is provided with a reset submodule, and each E1 transceiver is also provided with a reset submodule. The reset submodule of the optical fiber transceiver is configured to reset the optical fiber transceiver in response to determining that the optical fiber transceiver fails, and the reset submodule of the E1 transceiver is configured to reset the E1 transceiver in response to determining that the E1 transceiver fails. Each reset submodule is independently arranged, and is controlled by the CPU to achieve separately resetting the optical fiber transceiver or the E1 transceiver, without affecting other communication links, thereby solving the communication link interruption problem of the FPGA being disturbed, and improving the reliability.

The CPU 302 is connected to the FPGA 303 through a parallel bus, and writes data to be sent in to the FPGA and controls data sending.

The access apparatus 30 may receive downlink data sent by the control apparatus A and the control apparatus B of the control substation 20, and forward the downlink data to all control terminals 31 accessed to the access apparatus 30. The access apparatus 30 can receive uplink data sent by all the control terminals 31 accessed to the access apparatus 30, and forward the uplink data to the control apparatus A and the control apparatus B of the control substation 20. The downlink data may be a data frame and/or a command frame, and the uplink data may be a data frame.

Specifically, the process that the access apparatus 30 receives the downlink data sent by the control apparatus A or the control apparatus B of the control substation 20 and forwards the downlink data to all the control terminals 31 accessed to the access apparatus 30 is as follows. The two E1 interfaces 300 of the access apparatus 30 receive the downlink data sent by the control apparatus A and the control apparatus B of the control substation 20. The two E1 transceivers in the FPGA 303 read the downlink data, send the downlink data to the CPU 302 for processing, obtain data of a corresponding optical fiber channel, and then feed back the data to the FPGA 303. The eight optical fiber transceivers in the FPGA 303 send the downlink data to all the control terminals 31 accessed to the access apparatus 30 through the eight optical fiber interfaces 301.

The process that the access apparatus 30 receives the uplink data sent by all the control terminals 31 accessed to the access apparatus 30 and forwards the uplink data to the control apparatus A and the control apparatus B of the control substation 20 is as follows. The eight optical fiber interfaces 301 of the access apparatus 30 receives the uplink data sent by all the control terminals 31 accessed to the access apparatus 30. The eight optical fiber transceivers in the FPGA 303 read the uplink data, send the uplink data to the CPU 302 for processing, obtain data of a corresponding E1 channel, and then feed back the data to the FPGA 303. The two E1 transceivers in the FPGA 303 send the uplink data to the control apparatus A and the control apparatus B of the control substation 20 through the two E1 interfaces 300.

A physical layer of the optical fiber transceiver adopts 8b10b encoding mode, and a communication rate is 32.768 Mbits/s.

The E1 transceiver is communicated with an SDH device in the unbalanced transmission manner through a 75Ω coaxial cable. The physical layer of the E1 transceiver conforms to ITU-T G.703 specification, a communication rate is 2 Mbits/s, and a bit error rate is less than $10^{-8}$.

In addition, a link layer protocol of communication between the FPGA 303 and the eight optical fiber interfaces 301 is a self-owned protocol, and a link layer protocol of communication between the FPGA 303 and the two E1 interfaces 300 is a high-level data link control (HDLC) protocol.

Further, as shown in FIG. 2, the FPGA 303 further includes a watchdog module 305 connected to the CPU 302.

The watchdog module 305 is configured to reset the access apparatus 30 in response to determining that the CPU 302 fails. Specifically, the CPU 302 sends a feeding signal to the watchdog module 305 regularly according to a fixed period, and if the watchdog module 305 does not receive the feeding signal from the CPU 302 for more than a predetermined time, the watchdog module 305 determines that the CPU 302 fails and resets the access apparatus 30, thereby effectively preventing long-term communication interruption because the CPU 302 is disturbed and crashes or a bus through which the CPU 302 access to the FPGA 303 is disturbed, and improving the reliability.

The CPU 302 is configured to actively reset the access apparatus 30 in response to determining that the FPGA fails and in response to determining that the number of times the CPU 302 resets the access apparatus 30 is less than or equal to 3. Specifically, by taking an initial state as an example, the CPU 302 has ever received any correct data sent by the two E1 interfaces 300 and/or the eight optical fiber interfaces 301, and later, if the CPU 302 fails to receive a frame of correct data from the two E1 interfaces 300 and/or the eight optical fiber interfaces 301 for a continuous period Tnr, the CPU 302 determines that the FPGA 303 fails, actively resets the access apparatus 30, and records one resetting in a nonvolatile memory. After this resetting, if the CPU 302 fails to receive a frame of correct data from the two E1 interfaces 300 and/or the eight optical fiber interfaces 301 for the continuous period Tnr, the CPU 302 actively resets the access apparatus 30 again, and also records another resetting in the nonvolatile memory. After this resetting, if the CPU 302 fails to receive a frame of correct data from the two E1 interfaces 300 and/or the eight optical fiber interfaces 301 for the continuous period Tnr again, the CPU 302 resets the access apparatus 30 again and updates the number of resetting in the memory. When the number of resetting is 3, even if the CPU 302 fails to receive a frame of correct data from the two E1 interfaces 300 and/or the eight optical fiber interfaces 301 for the continuous period Tnr, the CPU 302 does not reset the access apparatus 30. If the CPU 302 receives a frame of correct data from the two E1 interfaces 300 and/or the eight optical fiber interfaces 301 after resetting, the CPU 302 clears the number of resetting recorded in the nonvolatile memory.

Embodiments of the present invention provide an access apparatus, the access apparatus includes: two E1 interfaces, eight optical fiber interfaces, a CPU and an FPGA. The two E1 interfaces are respectively connected to the control apparatus A and the control apparatus B of a control substation. The eight optical fiber interfaces are respectively connected to eight control terminals. The FPGA includes eight optical fiber transceivers and two E1 transceivers. The eight optical fiber transceivers are respectively connected to the eight optical fiber interfaces through serial interfaces. The two E1 transceivers are respectively connected to the two E1 interfaces through serial interfaces. Each of the eight optical fiber transceivers includes a reset submodule, and each of two E1 transceiver includes a reset submodule. The CPU is connected to the FPGA through a parallel bus. The access apparatus can achieve data receiving and sending through the FPGA, the two E1 interfaces and the eight optical fiber interfaces, and thus, is applicable to actual engineering. Meanwhile, in the FPGA, each optical fiber transceiver is provided with the reset submodule, and each E1 transceiver is also provided with the reset submodule, so the reliability of the access apparatus is improved, thereby saving the investment cost and reducing the maintenance difficulty while reducing the communication bandwidth occupied by a conventional safety and stability control system solution.

Figure 3:
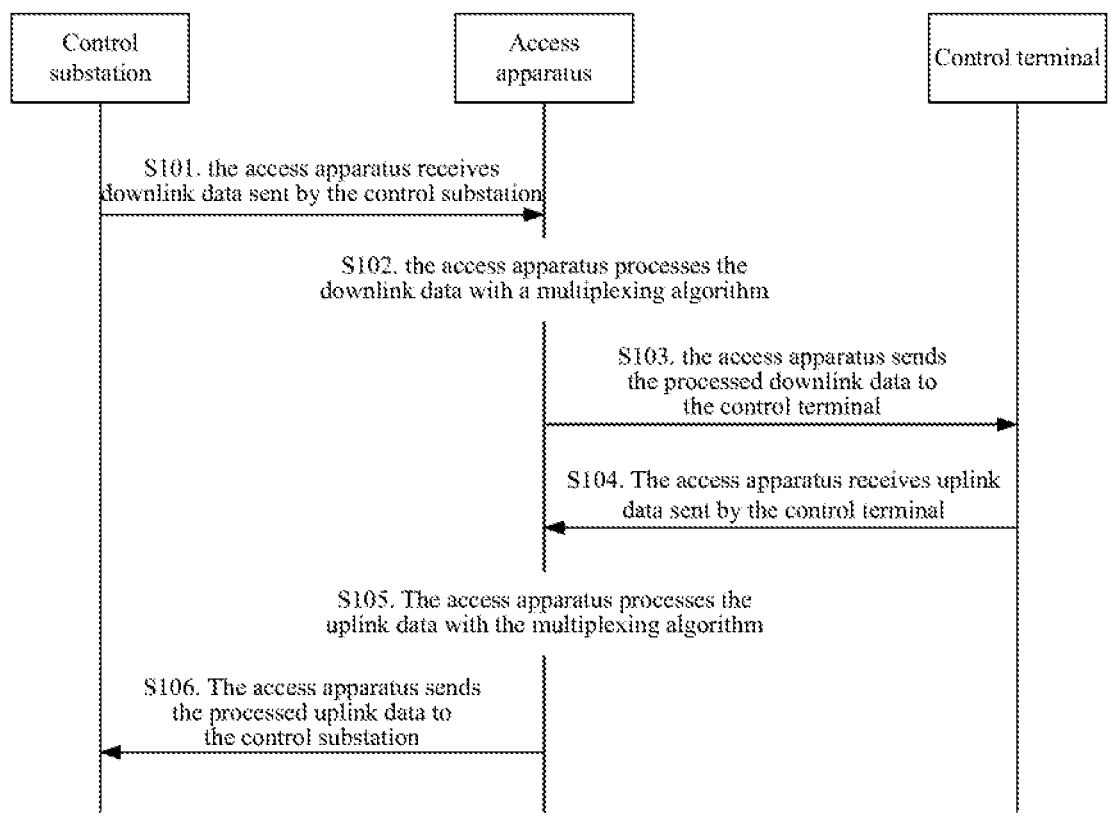
FIG. 3 is a flow chart illustrating a communication method of a load shedding system provided by an embodiment of the present invention.

FIG. 3 is a flow chart illustrating a communication method of a load shedding system provided by an embodiment of the present invention. The method is applicable to the load shedding system in above embodiments. As shown in FIG. 3, the method includes the following steps.

In step S101, the access apparatus receives downlink data sent by the control substation.

The downlink data may be a data frame or a command frame. The data frame may be data information, such as sheddable load information, power information, state information; and the command frame may be instruction information, such as the load shedding instruction and conformance recovery instruction.

In step S102, the access apparatus processes the downlink data with a multiplexing algorithm.

In step S103, the access apparatus sends the processed downlink data to the control terminal.

When the downlink data is the data frame, the processed downlink data is a processed data frame; and when the downlink data is the command frame, the processed downlink data is a processed command frame.

Specifically, the access apparatus sends the processed downlink data to all the control terminals accessed to the access apparatus simultaneously.

In step S104, the access apparatus receives uplink data sent by the control terminal.

The uplink data is a data frame.

Specifically, the access apparatus receives the uplink data sent by all the control terminals accessed to the access apparatus simultaneously.

In step S105, the access apparatus processes the uplink data with the multiplexing algorithm.

In step S106, the access apparatus sends the processed uplink data to the control substation.

Since the uplink data is the data frame, the processed uplink data is a processed data frame.

In addition, the access apparatus sends processed uplink data to the control apparatus A and the control apparatus B of the control substation in a polling manner at a regular time interval Tval. In each time interval Tval, the data sent to the control apparatus A and the control apparatus B of the control substation is received by the same optical fiber interface, so as to avoid that information of a certain control terminal is not sent in time due to accidental loss of a frame on the channel, thereby improving the reliability.

Further, Table 1 shows basic information of the downlink data, the processed downlink data, the uplink data and the processed uplink data.

K, L, M and N may be specifically determined according to needs of actual engineering, but shall meet the following principles:

$$\begin{cases} K \geq N \\ 8M \geq L \end{cases}.$$

As shown in Table 1, the control substation sends the downlink data to the access apparatus with a communication rate of K frame/s, and the control apparatus A and the control apparatus B of the specific control substation send one frame respectively in each communication. Each frame has 12 words, and each word includes 16 bits. In each communication, the downlink data processed by the access apparatus and sent to control terminal includes two frames, i.e., the first frame is sent by the control apparatus A of the control substation, and the second frame is sent by the control apparatus B. The control terminal sends the uplink data to the access apparatus in a similar way, which is not repeated herein for simplicity.

Meanwhile, as shown in Table 1, the access apparatus sends and receives data using a fixed time interval, and the frame length is also fixed, which can effectively prevent saturated attack and overflow attack, thereby improving the reliability.

In addition, in embodiments of the present invention, data is sent and received at a fixed time interval, and the time interval is less than or equal to the reciprocal of the communication rate.

Further, embodiments of the present invention also define the frame contents of the downlink data, the processed downlink data, the uplink data and the processed uplink data respectively.

Table 2 shows the frame content of the downlink data sent by the control substation to the access apparatus.

TABLE 1

|  | Downlink data from the control substation to the access apparatus | Downlink data to the control terminal after being processed by the access apparatus | Uplink data from the control terminal to the access apparatus | Uplink data to the control substation after being processed by the access apparatus |
| --- | --- | --- | --- | --- |
| Communication frequency (frame/s) | K | N | M | L |
| Number of frames per communication | One frame for each of the control apparatus A and the control apparatus B | Two frames for each control terminal | 1 | One frame for each of the control apparatus A and the control apparatus B |
| Length per frame (word) | 12 | 12 | 12 | 12 |

TABLE 2

| Word | Data frame | Command frame |
|---|---|---|
| 0 | Frame header (0x550a for the control apparatus A, and 0x550b for the control apparatus B) | Frame header (0x990a for the control apparatus A, and 0x990b for the control apparatus B) |
| 1 | Time synchronization mark (0xb2b2) | Control terminal 1 (command provided: 0x $\overline{xxxx}$; no command: 0x0000) |
| 2 | (BCD code) low-byte year, and high-byte month | Control terminal 2 (command provided: 0x $\overline{xxxx}$; no command: 0x0000) |
| 3 | (BCD code) low-byte day, and high-byte hour | Control terminal 3 (command provided: 0x $\overline{xxxx}$; no command: 0x0000) |
| 4 | (BCD code) low-byte minute, and high-byte second | Control terminal 4 (command provided: 0x $\overline{xxxx}$; no command: 0x0000) |
| 5 | (BCD code) millisecond | Control terminal 5 (command provided: 0x $\overline{xxxx}$; no command: 0x0000) |
| 6 | 0 | Control terminal 6 (command provided: 0x $\overline{xxxx}$; no command: 0x0000) |
| 7 | 0 | Control terminal 7 (command provided: 0x $\overline{xxxx}$; no command: 0x0000) |
| 8 | 0 | Control terminal 8 (command provided: 0x $\overline{xxxx}$; no command: 0x0000) |
| 9 | Overall information | Overall information |
| 10 | Sending sequence number (0 to (K − 1)) | Sending sequence number (0 to (K − 1)) |
| 11 | Check code (CRC16 of above 11 words) | Check code (CRC16 of above 11 words) |

Table 3 shows the frame content of the processed downlink data sent by the access apparatus to the control terminal.

TABLE 3

| Word | Data frame | Command frame |
|---|---|---|
| 0 | Frame header (0x330a) | Frame header (0x770a) |
| 1 | Time synchronization mark (0xb2b2) | (command provided: 0x $\overline{xxxx}$; no command: 0x0000) |
| 2 | (BCD code) low-byte year, and high-byte month | 0 |
| 3 | (BCD code) low-byte day, and high-byte hour | 0 |
| 4 | (BCD code) low-byte minute, and high-byte second | 0 |
| 5 | (BCD code) millisecond | 0 |
| 6 | 0 | 0 |
| 7 | 0 | 0 |
| 8 | 0 | 0 |
| 9 | Overall information | Overall information |
| 10 | Sending sequence number (0 to (N − 1)) | Sending sequence number (0 to (N − 1)) |
| 11 | Check code (CRC of above 11 words) | Check code (CRC of above 11 words) |
| 12 | Frame header (0x330b) | Frame header (0x770b) |
| 13 | Time synchronization mark (0xb2b2) | (command provided:0x $\overline{xxxx}$: no command: 0x0000) |
| 14 | (BCD code) low-byte year, and high-byte month | 0 |
| 15 | (BCD code) low-byte day, and high-byte hour | 0 |
| 16 | (BCD code) low-byte minute, and high-byte second | 0 |
| 17 | (BCD code) millisecond | 0 |
| 18 | 0 | 0 |
| 19 | 0 | 0 |
| 20 | 0 | 0 |
| 21 | Overall information | Overall information |
| 22 | Sending sequence number (0~(N − 1)) | Sending sequence number (0~(N − 1)) |
| 23 | Check code (CRC16 of the 11 words) | Check code (CRC16 of the 11 words) |

Table 4 shows the frame content of the uplink data sent by the control terminal to the access apparatus.

TABLE 4

| Word | Data frame |
|---|---|
| 0 | Frame header (0x440a) |
| 1 | Low word of Class I sheddable load of the control terminal |
| 2 | High word of Class I sheddable load of the control terminal |
| 3 | Low word of Class II sheddable load of the control terminal |
| 4 | High word of Class II sheddable load of the control terminal |

TABLE 4-continued

| Word | Data frame |
|---|---|
| 5 | Low word of Class III sheddable load of the control terminal |
| 6 | High word of Class III sheddable load of the control terminal |
| 7 | Abnormal information word of the control terminal |
| 8 | Identification code of the control terminal |
| 9 | Overall information |
| 10 | Sending sequence number (0 t (M − 1)) |
| 11 | Check code (CRC of above 11 words) |

Table 5 shows the frame content of the processed uplink data sent by the access apparatus to the control substation.

TABLE 5

| Word | Data frame |
|---|---|
| 0 | Frame header (0x660a for the A set, and 0x660b for the B set) |
| 1 | Low word of Class I sheddable load of the control terminal connected to the opticalfiber channel i (1-8) |
| 2 | High word of Class I sheddable load of the control terminal connected to the optical fiber channel i (1-8) |
| 3 | Low word of Class II sheddable load of the control terminal connected to the optical fiber channel i (1-8) |
| 4 | High word of Class II sheddable load of the control terminal connected to the optical fiber channel i (1-8) |
| 5 | Low word of Class III sheddable load of the control terminal connected to the optical fiber channel i (1-8) |
| 6 | High word of Class III sheddable load of the control terminal connected to the optical fiber channel i (1-8) |
| 7 | Abnormal information word of the control terminal connected to the optical fiber channel i (1-8) |
| 8 | Identification code of the control terminal connected to the optical fiber channel i (1-8) |
| 9 | Overall information |
| 10 | Sending sequence number (0 to (L-1)) |
| 11 | Check code (CRC16 of above 11 words) |

It should be noted that, 0x $\overline{xxxx}$ may be a load shedding category command, the low byte thereof indicates a positive code, the high byte thereof indicates a negative code; a specific command code is defined according to the engineering; and the access apparatus only needs to check whether the format is correct, without checking the specific content.

It may be known by comparing the contents of Table 2 and Table 3 that, when the control substation needs to send a load shedding command to any of the control terminals 1 to 8, for example, the control substation needs to send the load shedding command to the a-th control terminal, the control substation sends a command frame, the data in the a-th word in the command frame is 0x $\overline{xxxx}$, and other words of the rest control terminals are 0.

The sending sequence number may be increased by 1 whenever one frame is sent. If the sending sequence number is increased to the maximum value, the sending sequence number for sending the next frame becomes 0. The receiving side determines whether the data is repeated data according to whether the sending sequence number in the frame received this time and the sending sequence number in the frame received last time, to prevent a problem that repeated data is sent due to hardware malfunction and the receiving side cannot identify the hardware malfunction.

The length of the overall information is 1 word, that is, 16 bits, and different bits indicate different meanings. Table 6 shows a definition of the overall information (i.e., overall information corresponding to Table 2 and Table 5) of the frame transmitted between the access apparatus and the control substation.

TABLE 6

| bit | Downlink data | Processed uplink data |
|---|---|---|
| 0 | Reception failure of E1 channel (after resetting for three times, the E1 channel is still not successfully received) | Reception failure of E1 channel (after resetting for three times, the E1 channel is still not success fully received) |
| 1 | 0 | 0 |
| 2 | Reception of the E1 channel is abnormal (confirmed by a delay T1) | |
| 3 | 0 | 0 |
| 4 | Reception of the optical fiber channel 1 is abnormal (confirmed by a delay T2) | 0 |
| 5 | Reception of the optical fiber channel 2 is abnormal (confirmed by a delay T2) | 0 |
| 6 | Reception of the optical fiber channel 3 is abnormal (confirmed by a delay T2) | 0 |
| 7 | Reception of the optical fiber channel 4 is abnormal (confirmed by a delay T2) | 0 |
| 8 | Reception of the optical fiber channel 5 is abnormal (confirmed by a delay T2) | 0 |
| 9 | Reception of the optical fiber channel 6 is abnormal (confirmed by a delay T2) | 0 |
| 10 | Reception of the optical fiber channel 7 is abnormal (confirmed by a delay T2) | 0 |

TABLE 6-continued

| bit | Downlink data | Processed uplink data |
| --- | --- | --- |
| 11 | Reception of the optical fiber channel 8 is abnormal (confirmed by a delay T2) | 0 |
| 12 | Low bit of terminal number of current uplink data (optical fiber channel number) | 0 |
| 13 | Middle bit of terminal number of current uplink data (optical fiber channel number) | 0 |
| 14 | High bit of terminal number of current uplink data (optical fiber channel number) | 0 |
| 15 | 0 | 0 |

The meaning of the reception failure of the E1 channel is as follows. If the receiving side fails to receive new effective data sent by the sending side for a continuous period Te, a hardware receiving module is reset. If the receiving side still fails to receive the new effective data after the hardware receiving module has been reset for three times, the hardware receiving module is not reset again, and the sending side is informed of such situation through the overall information. If the receiving side receives the new effective data, the corresponding bit in the overall information is immediately reset to 0. If the sending side is informed that the receiving side still fails to receive the new effective data after the hardware receiving module has been reset for three times, a hardware sending module is reset after a delay time period Te. After the hardware sending module is reset, the sending side determines whether the bit indicating the reception failure of the E1 channel still exists in the subsequent delay period T. if the bit indicating the reception failure of the E1 channel still exists, the hardware sending module is reset again, and the hardware sending module is reset for three times at most. The relationship between T1 and Te is $T_1 > 6T_e$.

Table 7 shows a definition of the overall information (i.e., corresponding overall information in Table 3 and Table 4) of the frame transmitted between the access apparatus and the control terminal.

TABLE 7

| bit | Processed downlink data | Uplink data |
| --- | --- | --- |
| 0 | Reception failure of optical fiber channel (after resetting for three times, the optical fiber channel is still not successfully received) | Reception failure of optical fiber channel (after resetting for three times, the optical fiber channel is still not successfully received) |
| 1 | Reception of the optical fiber channel is abnormal (confirmed by a delay T3) | 0 |
| 2 | E1 channel data in data sent to the optical fiber channel is effective | 0 |
| 3 | 0 | 0 |
| 4 | The E1 channel receives new effective data | 0 |
| 5 | 0 | 0 |
| 6 | The E1 channel receives a new command | 0 |
| 7 | 0 | 0 |
| 8 | Reception of the E1 channel is abnormal (confirmed by a delay) | 0 |
| 9 | 0 | 0 |
| 10 | 0 | 0 |
| 11 | 0 | 0 |
| 12 | Low bit of the optical fiber channel number of current transmission | 0 |
| 13 | Middle bit of the optical fiber channel number of current transmission | 0 |
| 14 | High bit of the optical fiber channel number of current transmission | 0 |
| 15 | 0 | 0 |

When the control substation needs to send the load shedding instruction to any of the control terminals 1 to 8, for example, send the load shedding command to the a-th control terminal, the access apparatus sends the command frame to the a-th control terminal, and sends the data frame (the bits of the data frame except the frame header, the overall information, the sending sequence number and the check code are set to 0) to other control terminals. In addition, the bit indicating "the E1 channel data in the data sent to the optical fiber channel is effective" in the overall information is set to 0.

The access apparatus checks a state of last received data which is sent by the control substation when sending data to the control terminal. If the new effective data is obtained, the bit indicating "the E1 channel receives the new effective data" is set to 1, otherwise, the bit is set to 0. If the last received data sent by the control substation is new command data, the bit "the E1 channel receives a new command" is set to 1, otherwise, the bit is set to 0.

In addition, the control terminal may independently conduct multi-frame confirmation when receiving the load shedding command sent by the control apparatus A and the control apparatus B of the control substation via the access apparatus. The multi-frame confirmation method is to check whether Nc effective command frames are received in a period of time TC, and whether the Nc effective command frames are consistent. The control terminal finally checks whether the load shedding commands of the control apparatus A and the control apparatus B of the control substation are consistent. If the load shedding commands of the control apparatus A and the control apparatus B are not consistent, one with more loads is executed.

Embodiments of the present invention further provide a computer readable storage medium which stores a computer program. The computer program, when executed by a processor, realizes the communication method of the load shedding system described by above embodiments.

The computer storage medium of embodiments of the present invention may use any combination of one or more computer readable media. The computer readable medium may be a computer readable signal medium or a computer readable storage medium. The computer readable storage medium, for example, may be, but not limited to, a system, an apparatus or a device of electricity, magnetism, light, electromagnetism, infrared ray or semiconductor, or any combination thereof. More specific examples (non-exhaustive list) of the computer readable storage medium include: an electric connection of one or more wires, a portable computer hard disk, a hard disk, a random access memory (RAM), a read-only memory (ROM), an erasable programmable read-only memory (EPROM or a flash memory), an optical fiber, a portable compact disk read-only memory (CD-ROM), a light storage device, a magnetic storage device, or any proper combination thereof. Herein, the computer readable storage medium may be any tangible medium including or storing a program, and the program may be used by an instruction execution system, an apparatus or a device or used in a combination thereof.

The computer readable signal medium may be included in a baseband or be a data signal which is spread as a part of carrier, and carries a computer readable program code. Such spread data signal may adopt multiple forms, including but not limited to an electromagnetic signal, a light signal or any proper combination thereof. The computer readable signal medium may also be any computer readable medium other than the computer readable storage medium, and the computer readable medium may send, spread or transmit a program used by the instruction execution system, the apparatus or the device or in the combination thereof.

The program code in the computer readable medium may be transmitted with any proper medium, including but not limited to wireless transmission, wire transmission, optical cable transmission, RF transmission, or any proper combination thereof.

The computer program code for executing the operation of the present invention may be written with one or more program design languages or a combination thereof. The program design language includes object-oriented program design languages, such as Java, Smalltalk and C++, and also includes conventional procedural program design languages, such as "C" language or similar program design languages. The program code may be completely executed on a user computer, partially executed on the user computer, executed as an independent software package, executed partially on the user computer or partially on a remote computer, or completely executed on the remote computer or a server. In case of the remote computer, the remote computer may be connected to the user computer through any kind of network, including a local area network (LAN) or a wide area network (WAN), or may be connected to an external computer (such as being connected through an Internet by means of an Internet service provider).

It should be noted that, the above only describes exemplary embodiments of the present invention and applied technical principles. Those skilled in the art shall understand that the present invention is not limited to specific embodiments described herein. For those skilled in the art, various apparent variations, readjustments and replacements can be made without departing from a protection scope of the present invention. Therefore, although the present invention is described in detail through the above embodiments, the present invention is not limited to the above embodiments and may further include more other equivalent embodiments without departing from the concept of the present invention, while the scope of the present invention is decided by a scope of attached claims.

What is claimed is:

1. An access apparatus, comprising: two E1 interfaces, eight optical fiber interfaces, a central processing unit (CPU) and a field programmable gate array (FPGA),
   wherein one of the two E1 interfaces is connected to a control apparatus A of a control substation, and the other one of the two E1 interfaces is connected to a control apparatus B of the control substation;
   the eight optical fiber interfaces are respectively connected to eight control terminals;
   the FPGA comprises eight optical fiber transceivers and two E1 transceivers, wherein the eight optical fiber transceivers are respectively connected to the eight optical fiber interfaces through serial interfaces, the two E1 transceivers are respectively connected to the two E1 interfaces through serial interfaces, each of the eight optical fiber transceivers includes a reset submodule, and each of the two E1 transceivers includes a reset submodule;
   the CPU is connected to the FPGA through a parallel bus; and
   wherein the FPGA further comprises a watchdog module connected to the CPU;
   the watchdog module is configured to reset the access apparatus in response to determining that the CPU fails; and
   the CPU is configured to reset the access apparatus in response to determining that the FPGA fails and in response to determining that a number of times the CPU resets the access apparatus is less than or equal to 3.

2. The access apparatus according to claim 1, wherein a physical layer of the optical fiber transceiver adopts 8b10b encoding mode, and a communication rate is 32.768 Mbits/s; and
   a physical layer of the E1 transceiver conforms to ITU-T G.703 specification, a communication rate is 2 Mbits/s, and a bit error rate is less than $10^{-8}$.

3. The access apparatus according to claim 1, wherein the reset submodule of the optical fiber transceiver is configured to reset the optical fiber transceiver in response to determining that the optical fiber transceiver fails, and the reset submodule of the E1 transceiver is configured to reset the E1 transceiver in response to determining that the E1 transceiver fails.

4. A load shedding system, comprising: an access apparatus, a control substation, and at least one control terminal, wherein the access apparatus comprises: two E1 interfaces, eight optical fiber interfaces, a central processing unit (CPU) and a field programmable gate array (FPGA), wherein one of the two E1 interfaces is connected to a control apparatus A of a control substation, and the other one of the two E1 interfaces is connected to a control apparatus B of the control substation;

the eight optical fiber interfaces are respectively connected to eight control terminals;

the FPGA comprises eight optical fiber transceivers and two E1 transceivers, wherein the eight optical fiber transceivers are respectively connected to the eight optical fiber interfaces through serial interfaces, the two E1 transceivers are respectively connected to the two E1 interfaces through serial interfaces, each of the eight optical fiber transceivers includes a reset submodule, and each of the two E1 transceivers includes a reset submodule;

the CPU is connected to the FPGA through a parallel bus; and wherein the FPGA further comprises a watchdog module connected to the CPU;

the watchdog module is configured to reset the access apparatus in response to determining that the CPU fails; and the CPU is configured to reset the access apparatus in response to determining that the FPGA fails and in response to determining that a number of times the CPU resets the access apparatus is less than or equal to 3.

5. The load shedding system according to claim 4, wherein a physical layer of the optical fiber transceiver adopts 8b10b encoding mode, and a communication rate is 32.768 Mbits/s; wherein a physical layer of the E1 transceiver conforms to ITU-T G.703 specification, a communication rate is 2 Mbits/s, and a bit error rate is less than $10^{-8}$.

6. The load shedding system according to claim 4, wherein the reset submodule of the optical fiber transceiver is configured to reset the optical fiber transceiver in response to determining that the optical fiber transceiver fails, and the reset submodule of the E1 transceiver is configured to reset the E1 transceiver in response to determining that the E1 transceiver fails.

7. A communication method, applicable to a load shedding system, wherein the load shedding system comprises: an access apparatus, a control substation, and at least one control terminal, wherein the access apparatus comprises: two E1 interfaces, eight optical fiber interfaces, a central processing unit (CPU) and a field programmable gate array (FPGA), wherein one of the two E1 interfaces is connected to a control apparatus A of a control substation, and the other one of the two E1 interfaces is connected to a control apparatus B of the control substation; and wherein the eight optical fiber interfaces are respectively connected to eight control terminals;

the FPGA comprises eight optical fiber transceivers and two E1 transceivers, wherein the eight optical fiber transceivers are respectively connected to the eight optical fiber interfaces through serial interfaces, the two E1 transceivers are respectively connected to the two E1 interfaces through serial interfaces, each of the eight optical fiber transceivers includes a reset submodule, and each of the two E1 transceivers includes a reset submodule; and the CPU is connected to the FPGA through a parallel bus;

wherein the FPGA further comprises a watchdog module connected to the CPU;

the watchdog module is configured to reset the access apparatus in response to determining that the CPU fails; and the CPU is configured to reset the access apparatus in response to determining that the FPGA fails and in response to determining that a number of times the CPU resets the access apparatus is less than or equal to 3; and wherein the communication method comprises:

receiving downlink data sent by the control substation;

processing the downlink data with a multiplexing algorithm; and sending the processed downlink data to the at least one control terminal, wherein the downlink data is two data frames or two command frames, the processed downlink data is two processed data frames or two processed command frames, and the two processed data frames or the two processed command frames respectively correspond to the control apparatus A and the control apparatus B of the control substation.

8. The method according to claim 7, further comprising:

receiving uplink data sent by the at least one control terminal;

processing the uplink data with the multiplexing algorithm; and sending the processed uplink data to the control substation, wherein the uplink data is a data frame and the processed uplink data is a processed data frame.

9. The method according to claim 7, wherein the command frame comprises 12 words, and each word comprises 16 bits; and wherein the command frame comprises: a frame header with a length of 1 word, a control command with a length of 8 words, overall information with a length of 1 word, a sending sequence number with a length of 1 word and a cyclic redundancy check (CRC) code with a length of 1 word, and wherein the control command comprises a positive code and a negative code.

10. The method according to claim 7, wherein the data frame comprises 12 words, and each word comprises 16 bits; and wherein the data frame comprises: a frame header with a length of 1 word, data information with a length of 8 words, overall information with a length of 1 word, a sending sequence number with a length of 1 word and a CRC code with a length of 1 word.

11. The method according to claim 8, wherein the data frame comprises 12 words, and each word comprises 16 bits; and wherein the data frame comprises: a frame header with a length of 1 word, data information with a length of 8 words, overall information with a length of 1 word, a sending sequence number with a length of 1 word and a CRC code with a length of 1 word.

12. A non-transitory computer readable storage medium, storing a computer program, wherein the computer program, when executed by a processor, implements the communication method of claim 7.

* * * * *